(12) United States Patent
Liu

(10) Patent No.: US 8,952,896 B2
(45) Date of Patent: Feb. 10, 2015

(54) COB MODULE OF AN OPTICAL MOUSE

(75) Inventor: Chin-Lin Liu, Fengyuan (TW)

(73) Assignee: Elan Microelectronics Corporation, Hsinchu (TW)

( * ) Notice: Subject to any disclaimer, the term of this patent is extended or adjusted under 35 U.S.C. 154(b) by 758 days.

(21) Appl. No.: 12/379,952

(22) Filed: Mar. 5, 2009

(65) Prior Publication Data

US 2009/0256804 A1 Oct. 15, 2009

(51) Int. Cl.
| | |
|---|---|
| G06F 3/033 | (2013.01) |
| G09G 5/08 | (2006.01) |
| G06F 3/03 | (2006.01) |
| G06F 3/0354 | (2013.01) |
| G06F 3/038 | (2013.01) |

(52) U.S. Cl.
CPC .......... *G06F 3/0317* (2013.01); *G06F 3/03543* (2013.01); *G06F 3/0383* (2013.01)
USPC ........................................................ 345/163

(58) Field of Classification Search
USPC ................................................ 345/163–167
See application file for complete search history.

(56) References Cited

U.S. PATENT DOCUMENTS

| | | | | |
|---|---|---|---|---|
| 5,912,661 | A * | 6/1999 | Siddiqui ........................ | 345/166 |
| 6,531,996 | B1 * | 3/2003 | Murade ............................ | 345/98 |
| 6,541,762 | B2 * | 4/2003 | Kang et al. ..................... | 250/239 |
| 6,653,724 | B1 * | 11/2003 | Kim et al. ....................... | 257/684 |
| 6,927,758 | B1 * | 8/2005 | Piot et al. ....................... | 345/166 |
| 7,045,775 | B2 * | 5/2006 | Leong et al. ................... | 250/239 |
| 2002/0070919 | A1 * | 6/2002 | Kajihara ......................... | 345/166 |
| 2002/0084986 | A1 * | 7/2002 | Armstrong ..................... | 345/163 |
| 2003/0034959 | A1 * | 2/2003 | Davis et al. .................... | 345/166 |
| 2004/0046741 | A1 * | 3/2004 | Low et al. ...................... | 345/166 |
| 2004/0233170 | A1 * | 11/2004 | Kang ............................. | 345/166 |
| 2005/0190158 | A1 * | 9/2005 | Casebolt et al. ............... | 345/166 |
| 2006/0007148 | A1 * | 1/2006 | Theytaz et al. ................ | 345/163 |
| 2006/0114232 | A1 * | 6/2006 | Choi .............................. | 345/166 |
| 2006/0187209 | A1 * | 8/2006 | Lai et al. ........................ | 345/166 |
| 2007/0181785 | A1 * | 8/2007 | Helbing et al. ................ | 250/221 |
| 2007/0285842 | A1 * | 12/2007 | Boljanovic et al. ........ | 360/245.3 |
| 2008/0030380 | A1 * | 2/2008 | Rensberger et al. ............ | 341/22 |

FOREIGN PATENT DOCUMENTS

TW 550650 9/2003

* cited by examiner

*Primary Examiner* — Patrick F Marinelli
(74) *Attorney, Agent, or Firm* — Muncy, Geissler, Olds & Lowe, P.C.

(57) ABSTRACT

A COB module of an optical mouse has a controller circuit and optical components of the optical mouse integrated thereon, so as to improve the problem with conventional optical mice that light path shifting tends to occur and improve the imaging definition. By disposing a button and wheel mechanism independently outside the COB module, the optical mouse has significantly improved flexibility in design, lower cost related to design alteration, and relaxed requirements on alignment and correction during production.

18 Claims, 7 Drawing Sheets

COB MODULE OF AN OPTICAL MOUSE

FIELD OF THE INVENTION

The present invention is related generally to an optical mouse and, more particularly, to a chip-on-board (COB) module of an optical mouse.

BACKGROUND OF THE INVENTION

Optical components of an optical mouse are shown in FIG. 1, and to facilitate mass production and assembly, these components are manufactured separately. During assembly, a light source device 12 and a sensor chip 14 are soldered onto a printed circuit board (PCB) 16, and a light source mount 10 is fixed onto the PCB 16 in a tight fit to prevent swing of the light source device 12. The PCB 16 has an opening 162 to allow light to pass therethrough, and a lens 18 is placed beneath the opening 162 and fixed onto the PCB 16. By means of a recess 192 and a fool-proof structure 194, the lens 18 is in turn placed on a base 19 to align the light path with a light hole 196.

FIG. 2 depicts a light path of the optical mouse shown in FIG. 1. The light source device 12 is generally a red LED, and the light emitted from the light source device 12 is sequentially refracted and reflected by the lens 18, and then passes through the light hole 196 to impinge on a plane beneath the optical mouse. From there, the light is reflected back and passes through the lens 18 to be imaged onto the sensor chip 14. Different features and roughness of the desktop surface will result in different energy intensity of the reflected light to exhibit corresponding features in the image. When the optical mouse is moved, continuous patterns will be obtained in the sensor chip 14 which then, according to difference in positions of features of the continuous images, compares and analyzes each of the images to determine the moving direction and displacement of the optical mouse. In other words, imaging quality is a key factor that dominates performance of the optical mouse. Hence, when loose engagement or misalignment among individual parts of the optical mouse occurs, light reflected from the desktop surface will fail to follow the correct light path to travel to the sensor chip 14. Consequently, the sensor chip 14 will retrieve a drifting or blurred image, leading to incorrect recognition of the image.

As molds used by various manufacturers for producing the separate optical parts have non-uniform specifications, problems such as varied height of the mouse bases, poor close-fit and poor fixation effect among individual components often arise. Consequently, the resulting optical mice tend to become loose in the Z-axis (vertical) direction during operation, thereby causing shifting and out-of-focus of the light path.

As an effort to reduce the assembly errors during production, U.S. Pat. No. 6,462,330 to Venkat et al. suggests packaging the lens into a package of the sensor chip, U.S. Pat. No. 7,045,775 to Leong et al. suggests packaging both the lens and the LED into the package of the sensor chip, and U.S. Pat. No. 7,199,350 to Chien suggests packaging the lens, the LED and a controller chip of the optical mouse all into the package of the sensor chip. Although these arts feature a high level of integration, none of them is of a COB structure; rather, they are limited by the chip pins, and once the pin design is altered, the lead frame of the whole package must be remolded, which is labor-consuming, time-consuming and very costly.

On the other hand, U.S. Pat. Nos. 6,541,762 and 6,653,724 disclose an optical mouse implemented in a COB fashion, in which a sensor chip is soldered in form of a die onto a smaller secondary PCB, which is in turn fixed to a primary PCB of the optical mouse. However, this kind of optical mouse has a low level of integration because the PCB of the COB package must be fixed to another PCB (so it is also known as a secondary COB).

SUMMARY OF THE INVENTION

An objective of the present invention is to provide a COB module of an optical mouse featuring a high level of integration. Owing to the modular structure, relative positions among optical components are absolutely fixed, and loose engagement or misalignment is less likely to occur among the optical components, so the light path is made more accurate and the time required for assembly and correction during production of the optical mice are completely eliminated, thereby improving the production yield.

Another objective of the present invention is to provide an optical mouse that has a human-machine interface (HMI) arranged outside the COB module, thereby enhancing the flexibility in design of the optical mouse.

According to the present invention, a COB module of an optical mouse includes a module printed circuit board (PCB), which has a chip incorporating a sensor circuit soldered thereon in form of a COB structure and has other passive elements and a light source device also soldered thereon. A controller circuit may be integrated on the chip incorporating the sensor circuit or formed on another separate chip soldered onto the PCB. A light path formed by the lens allows light from the light source device to be imaged onto the chip incorporating the sensor circuit.

According to the present invention, an optical mouse includes the aforesaid COB module fixed on a mouse base, the mouse base having a light hole for the light path to pass therethrough, a button and wheel mechanism disposed on the mouse base, and a ribbon cable for connecting the button and wheel mechanism to the module PCB.

By integrating the optical parts and the controller circuit of the optical mouse, the present invention achieves enhanced flexibility in design, improved imaging definition and lower cost of production and design alteration.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 1:
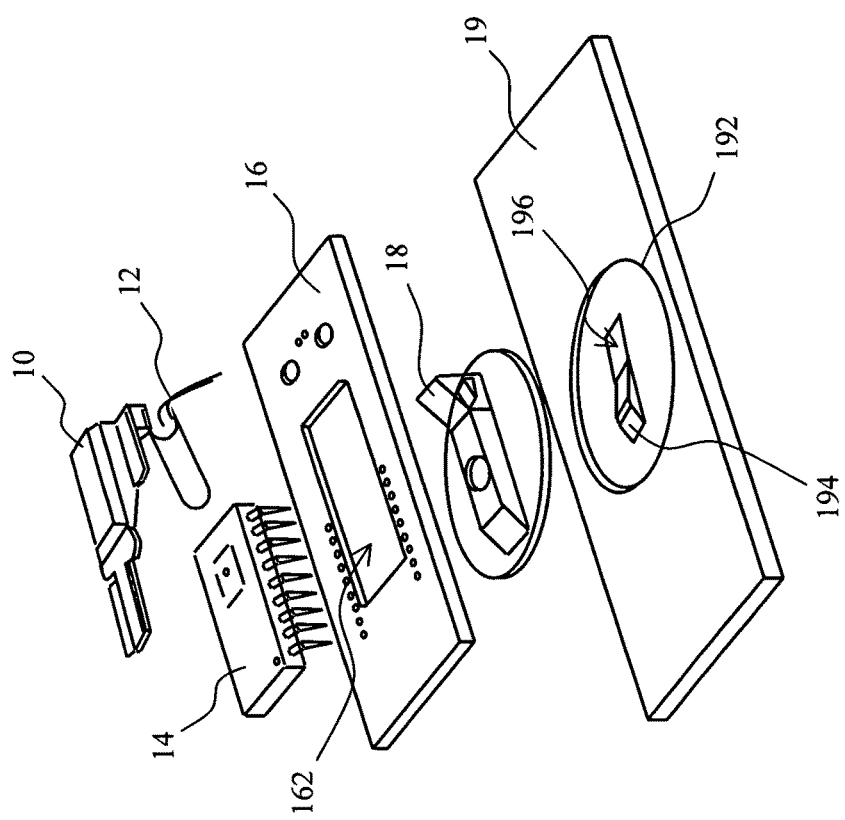
FIG. 1 is a schematic view of optical components of a conventional optical mouse.
Figure 2:
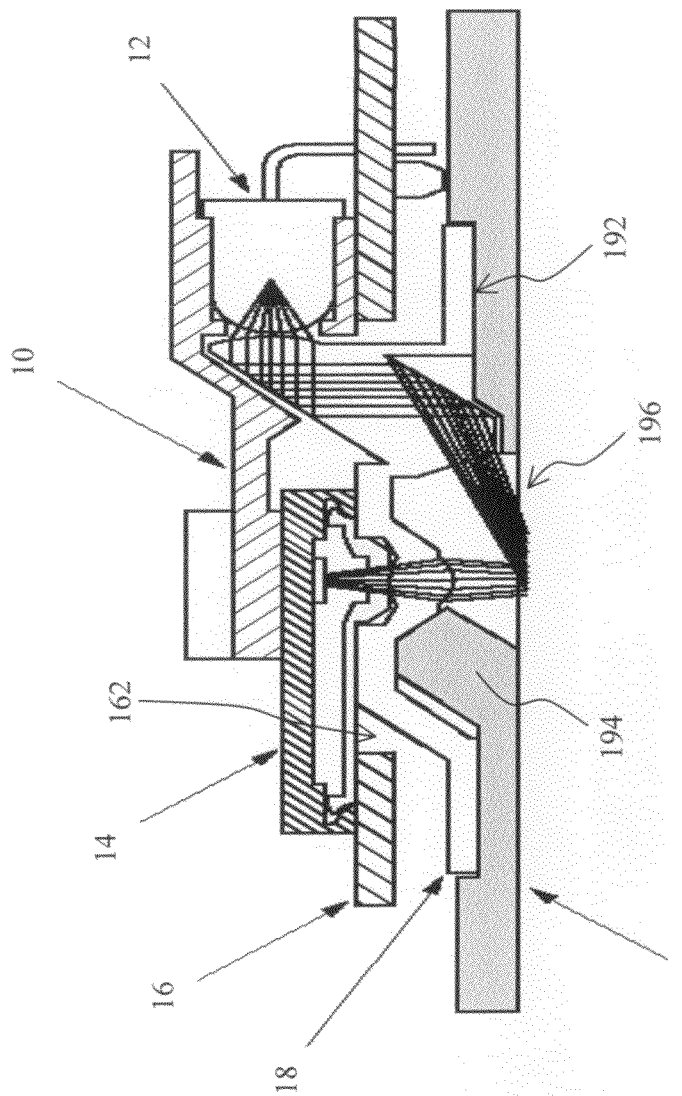
FIG. 2 is a cross-sectional view of the conventional optical components when being assembled.
Figure 3:
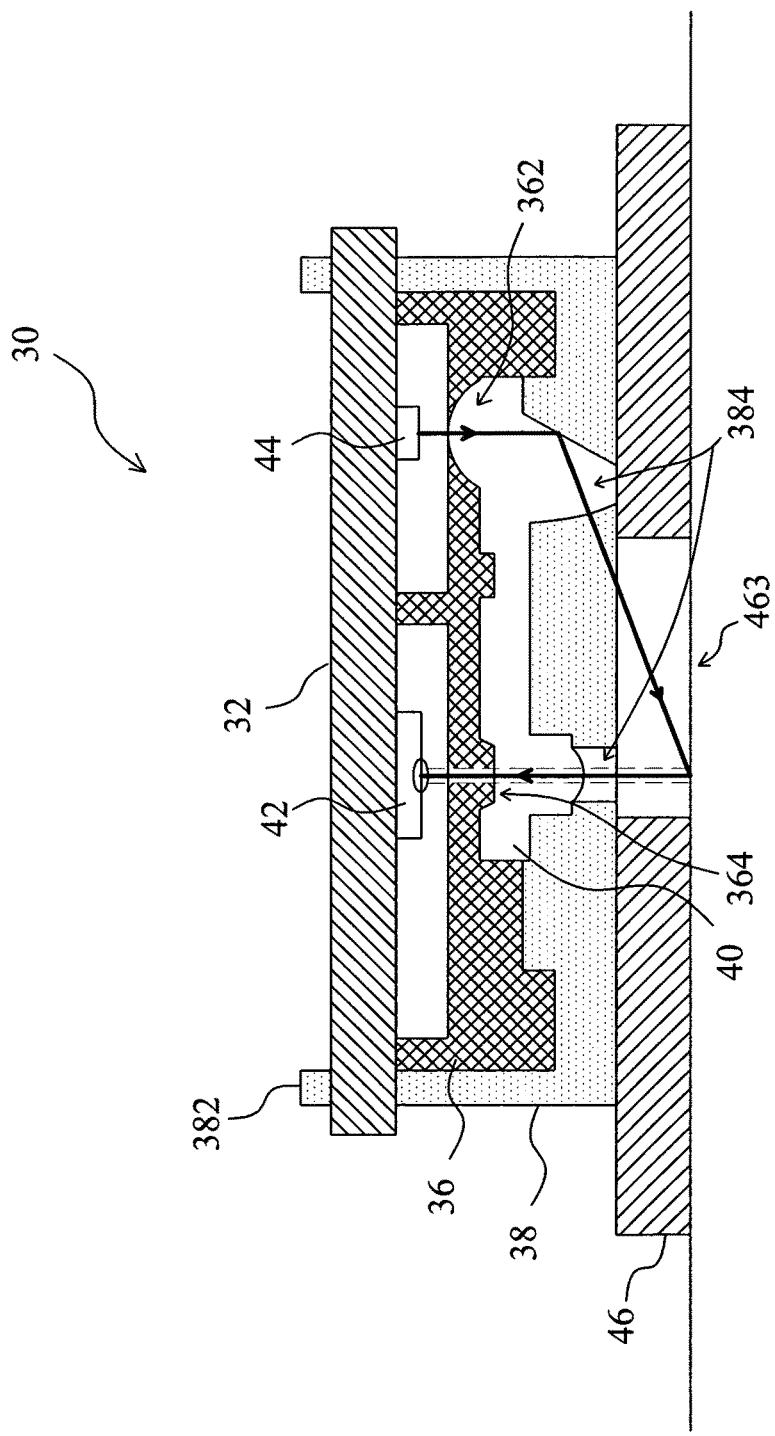
FIG. 3 is a schematic view of a first embodiment of a COB module according to the present invention.

In an embodiment as shown in FIG. 3, a COB module 30 of an optical mouse includes a module PCB 32 formed with circuits thereon. Passive elements such as resistors, capacitors and the like, in form of a dual-line package (DIP) or surface mount device (SMD) package, are fixed onto the module PCB 32 by using the card soldering or surface mounting technology (SMT). For purpose of simplicity, details of passive elements and wiring, which shall be readily appreciated by those skilled in the art, are omitted in FIG. 3. A module chip 42 having a sensor circuit and a controller circuit integrated therein is soldered in form of a COB structure onto the module PCB 32. For example, an LED light source device 44 is soldered in form of a DIP or SMD package onto the module PCB 32 through card soldering or SMT soldering. A photo shield 36 fixes a lens 40 in place, and preferably is made of an opaque material. The photo shield 36 is formed with only two openings 362, 364 therein to allow light following a particular path to pass therethrough, thereby achieving an effect of shielding stray light. Light emitted by the light source device 44 passes through the openings 362, refracted by the lens 40, and passes through cutouts 384 in the enclosure 38 and light hole 463 in the mouse base 46 to impinge on a surface with which the mouse base 46 makes contact. The lens 40 images the light diffused or scattered to the module chip 42, which then analyzes the light to obtain such information as displacement and direction of the optical mouse. In this embodiment, all the optical parts are integrated into a modular structure, so absolutely fixed relative positions among individual optical components, high precision of the light path, high definition of the resulting image, elimination of the time necessary for assembling and calibrating the optical components during production are accomplished. In this embodiment, the module chip 42 is soldered by using the COB packaging technology onto a surface of the module PCB 32 that faces downwards. By use of the COB module 30, only a single module PCB 32 is needed for each optical mouse. In other embodiments, the image sensor circuit and the mouse controller circuit may be implemented as two separate chips soldered onto the module PCB 32 respectively, in which case the chip incorporating the sensor circuit must be aligned with the light path.

The COB architecture employed in the present invention makes the design more flexible. When functions of the chip pins are altered, e.g., added or deleted, what needs to be done is to alter the circuit design of the module PCB 32 and clean up the board but not need to replace the lead frame design of the package by remolding. As a result, enhanced flexibility in design is achieved and, consequently, cost related to design modification is further saved.

Figure 4:
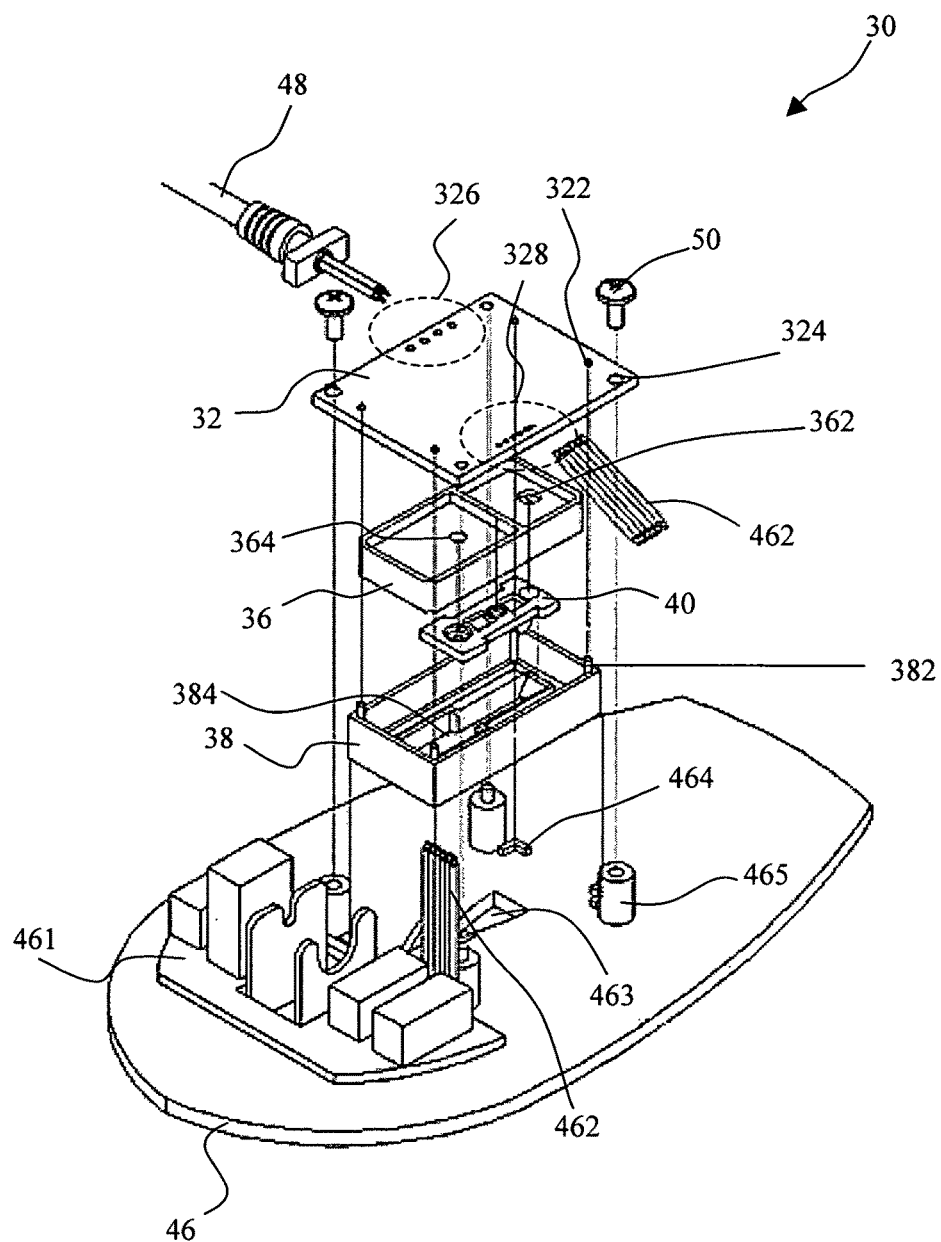
FIG. 4 is a schematic view of an embodiment of an optical mouse according to the present invention.

FIG. 4 is an exploded view of an optical mouse according to the present invention. A button and wheel mechanism 461 is independent from the COB module 30, for example, is disposed on the mouse base 46. Button signals and wheel signals generated by operating the button and wheel mechanism 461 are transmitted to an input terminal 328 of the module PCB 32 through a ribbon cable 462. The module chip 42 makes calculations based on displacement information of the optical mouse as well as the wheel signals and button signals, so as to output a mouse control signal to the host via a USB cable 48 connected with the output terminal 326. Referring to FIGS. 3 and 4, in this embodiment, the photo shield 36 serves to fix and maintain distances and relative positions among the lens 40, the module chip 42 and the light source device 44. The enclosure 38 covers and fixes the photo shield 36 and the lens 40, and with a tongue 382 thereof, engages with a prefabricated engagement hole 322 on the module PCB 32. In other embodiments, the tongue may also be disposed on the photo shield 36, or other engagement devices and mechanisms that can engage with each other, such as slide rails and screws, may be used to replace the tongue 382 and the engagement hole 322. Upon completion of assembly of the COB module 30, screws 50 are threaded into female studs 465 to, in conjunction with module mounts 464, fix the COB module 30 to the mouse module 46.

In conventional optical mice, only optical components are integrated, while the mouse controller is still implemented, along with other passive elements, on a separate chip that is soldered to a primary PCB; also, the wheel and button mechanism is also disposed on the primary PCB. Consequently, once the mouse designer intends to make modification on the mouse profile which necessitates modification of positions of the buttons and the wheel, the board must be cleaned up so as to allow alteration of circuits on the primary PCB; furthermore, the button position, the wheel position and the light path must be precisely aligned with each other during assembly in order for the optical mouse to operate properly. In contrast, the optical mouse according to the present invention has the lens 40 and the mouse controller integrated into the COB module 30, and the button and wheel mechanism 461 is disposed independently on the mouse base 46, so the mouse designer may adjust the relative positions between the button and wheel mechanism 461 and the light hole 463 freely and also modify the profile and size of the mouse base 46 freely, so long as light exiting the COB module 30 is allowed to pass through the light hole 463. Hence, the optical mouse according to the present invention features high flexibility in design and has lower requirements on alignment. Once the COB module according to the present invention is connected with a PC cable as well as the button signals and the wheel signals, functions of a complete optical mouse can be obtained, thereby saving more labor and time than the prior arts in practical production.

Figure 5:
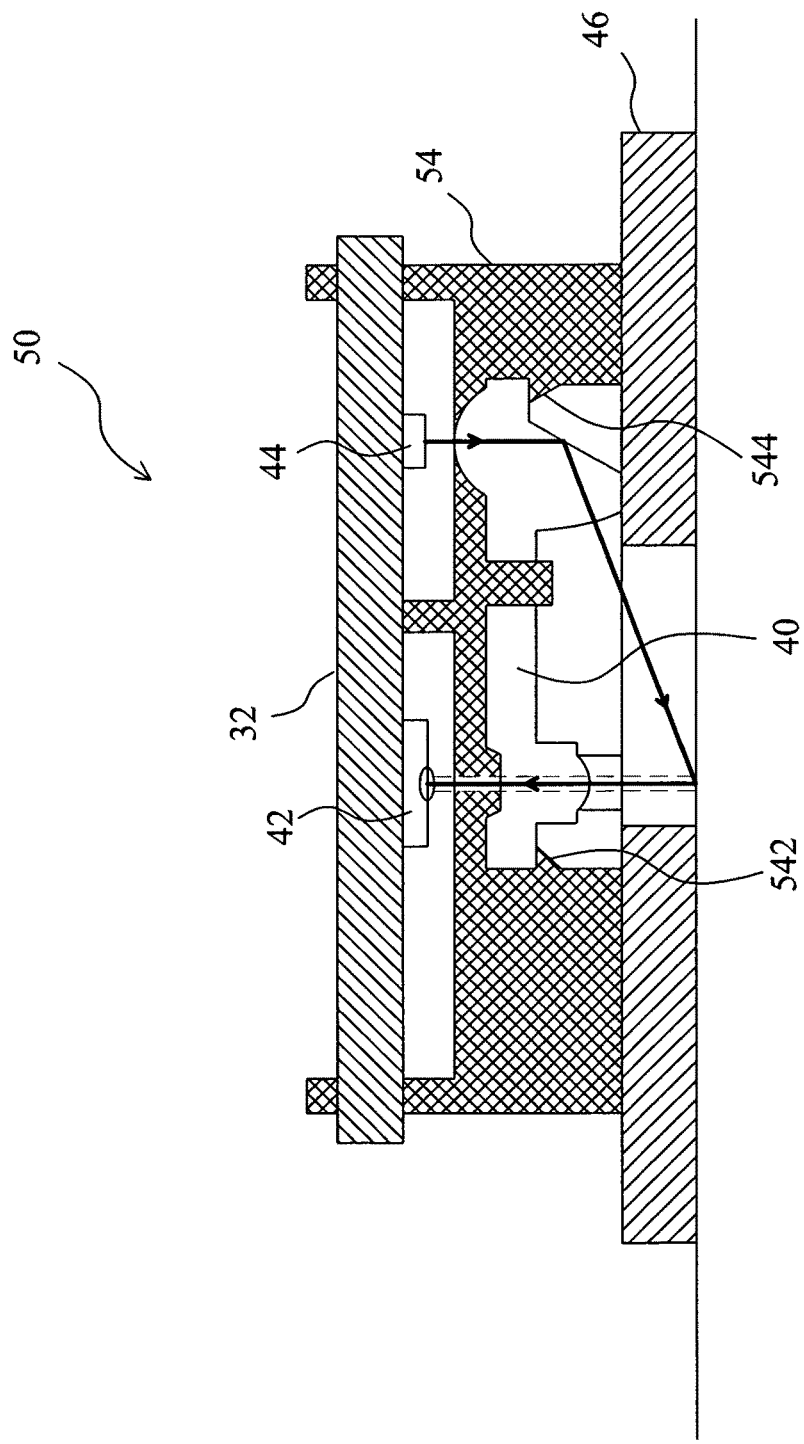
FIG. 5 is a side view of a second embodiment of a COB module according to the present invention.

FIG. 5 is a side view of a second embodiment of a COB module according to the present invention. The module chip 42 and the light source device 44 are soldered onto the module PCB 32. A photo shield 54, which serves dual functions of blocking light and protecting a lens 55, is formed with engagement structures 542 and 544 to engage with the lens 40 to form a COB module 50. Light emitted from the light source device 44 passes through the photo shield 54 and reflected by the lens 40 to pass through the light hole in the mouse base 46. The diffused or scattered light then passes through the lens 40 to be imaged onto the module chip 52. In this embodiment, the photo shield 54 functions as a combination of the photo shield 36 and the enclosure 38 of the embodiment shown in FIG. 3, so the number of parts is reduced.

Figure 6:
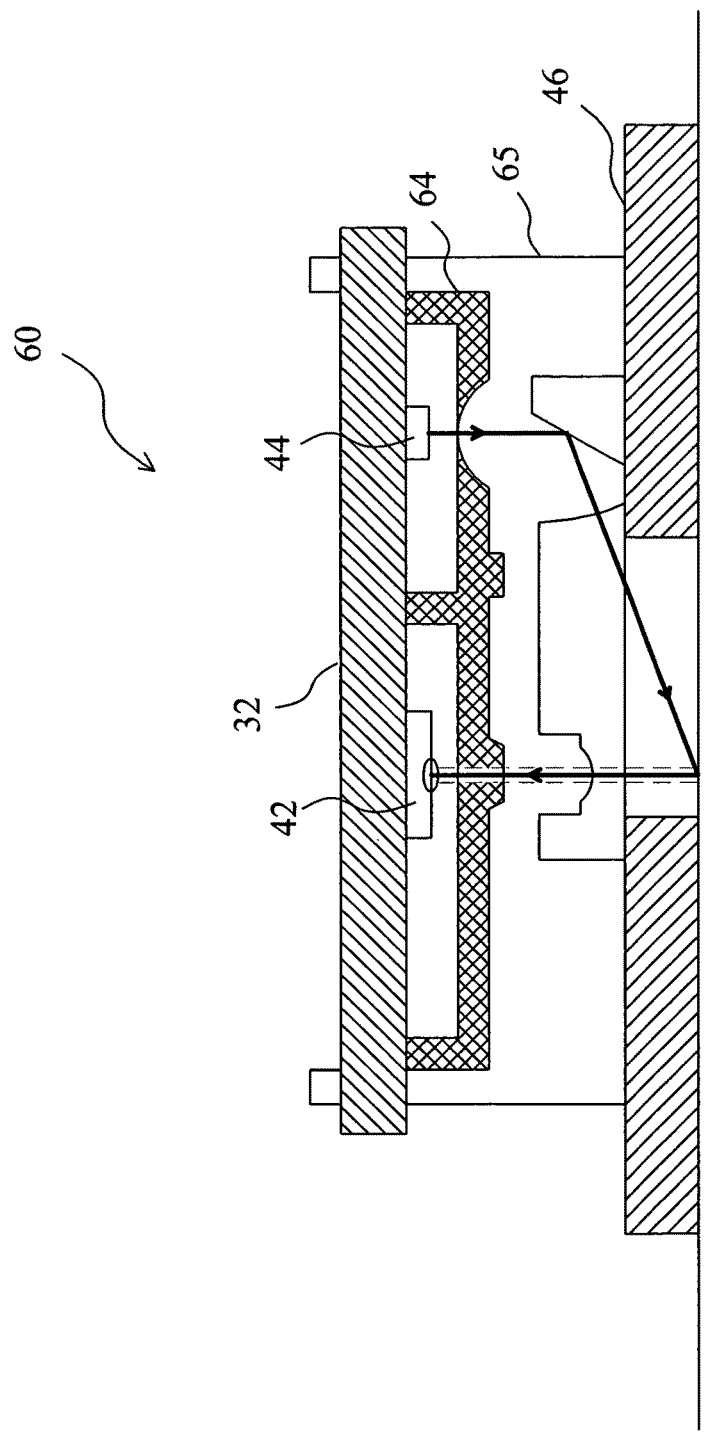
FIG. 6 is a side view of a third embodiment of a COB module according to the present invention.

FIG. 6 is a side view of a third embodiment of a COB module according to the present invention. A lens 65 in a COB module 60 engages with the module PCB 32 and fixes a photo shield 64. Two openings of the photo shield 64 are aligned with the module chip 42 and the light source device 44 soldered onto the module PCB 32 respectively for the light emitted from the light source device 44 to pass therethrough. In this embodiment, the lens 65 functions as a combination of the lens 40 and the enclosure 38 of the embodiment shown in FIG. 3, so the number of parts is reduced.

Figure 7:
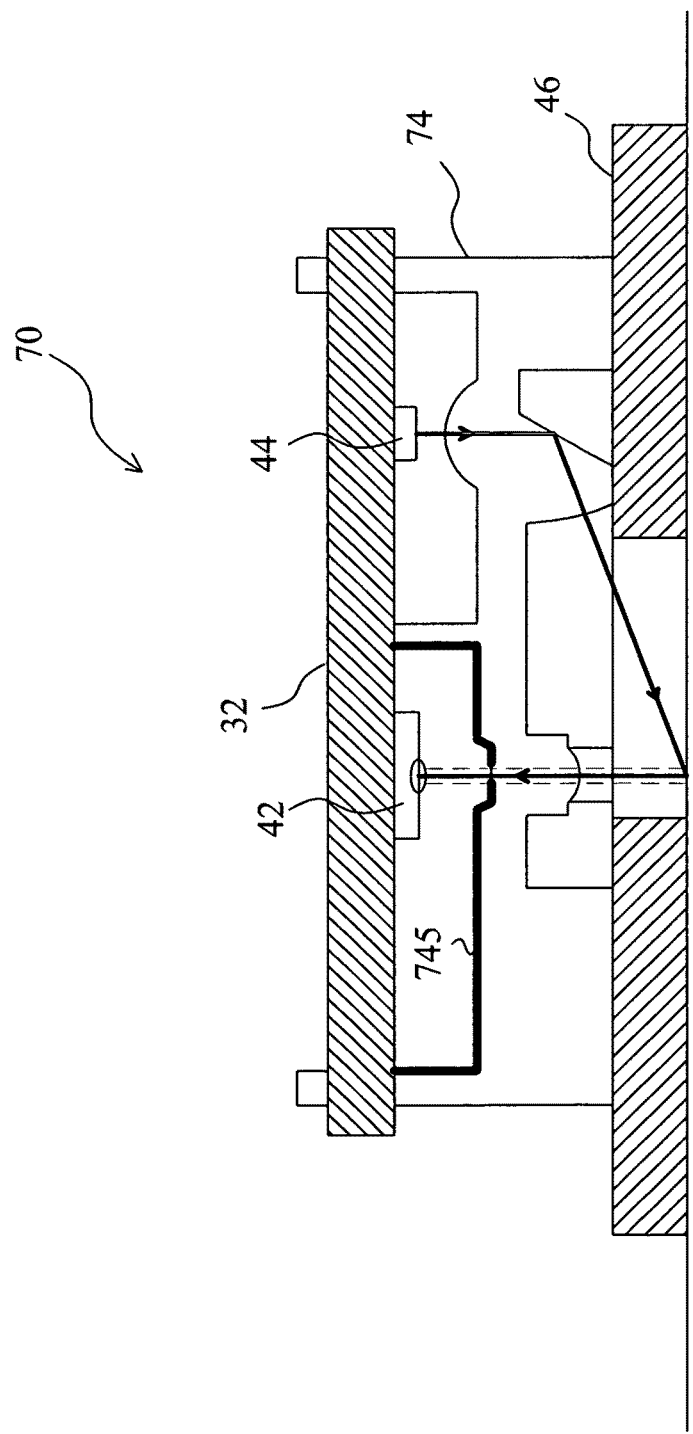
FIG. 7 is a schematic view of a fourth embodiment of a COB module according to the present invention.

FIG. 7 is a schematic view of a fourth embodiment of a COB module according to the present invention. The module chip 42 and the light source device 44 are soldered onto the module PCB 32, and the lens 74 engages with the module PCB 32 to form a COB module 70. The lens 74, on a portion thereof adjacent to the module chip 42, is coated with a photoresist layer 745 to replace the function of the photo shield in the aforesaid embodiments. Light emitted from the light source device 44 is reflected by the lens 74 and passes through the light hole in the mouse base 46. The diffused or scattered light then passes through the lens 74 to be imaged onto the module chip 42. In this embodiment, the lens 74 not only functions as a combination of the lens 40 and the enclosure 38 of the embodiment shown in FIG. 3, but also allows for elimination of the independent photo shield 36. In other embodiments, a photoresist layer may also be applied to a surface of the lens 74 adjacent to the light source device 44 to regulate the direction in which the light exits the light source device 44.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A chip-on-board (COB) module of an optical mouse for being mounted on a mouse base, comprising:
   a module printed circuit board;
   a chip including a sensor circuit, soldered in the form of a COB structure onto the module printed circuit board;
   a light source device soldered onto the module printed circuit board;
   a lens aligned with the chip and the light source device;
   an enclosure separate and distinct from the mouse base holding the lens therein and engaged with the module printed circuit board, wherein the COB module is for being mounted on the mouse base and light generated from the light source device is able to pass through the enclosure; and
   an opaque photo shield having two openings aligned with the chip including the sensor circuit and the light source devices, respectively,
   wherein a controller circuit is integrated on the chip or on another chip soldered onto the module printed circuit board,
   wherein the enclosure has a sidewall to form a space with a top opening to accommodate the chip, the light source, the opaque photo shield, and the lens,
   wherein the top opening is covered by the module printed circuit board, and
   wherein the sensor circuit and the light source device are soldered onto a same side of the module printed circuit board and are inside the space formed by the enclosure.

2. The COB module of claim 1, wherein the light source device includes a light emitting diode.

3. The COB module of claim 1, wherein the enclosure is formed with a cutout for light to pass therethrough.

4. The COB module of claim 1, wherein the lens engages with the opaque photo shield.

5. The COB module of claim 1, wherein the module printed circuit board further comprises an output terminal for electrically wired connecting to and outputting a mouse control signal to an external host.

6. The COB module of claim 1, wherein the module printed circuit board further comprises an input terminal for receiving a button signal or a wheel signal of the optical mouse.

7. The COB module of claim 1, wherein the enclosure further covers and fixes the lens.

8. The COB module of claim 1, wherein the opaque photo shield and the enclosure are combined as one.

9. An optical mouse, comprising:
   a mouse base having a light hole;
   a button and wheel mechanism, for generating button signals and wheel signals, disposed directly on the mouse base;
   a chip-on-board (COB) module disposed directly on the mouse base and comprising:
   a module printed circuit board;
   a chip including a sensor circuit, soldered in the form of a COB structure onto the module printed circuit board;
   a light source device soldered onto the module printed circuit board;
   a lens aligned with the chip and the light source device;
   a ribbon cable connecting the button and wheel mechanism to the input terminal of the module printed circuit board;
   an enclosure separate and distinct from the mouse base holding the lens therein and engaged with the module printed circuit board, wherein the COB module is mounted on the mouse base and light generated from the light source device is able to pass through the enclosure; and
   an opaque photo shield having two openings aligned with the chip including the sensor circuit and the light source devices, respectively,
   wherein a controller circuit is integrated on the chip or on another module chip soldered onto the module printed circuit board,
   wherein the enclosure has a sidewall to form a space with a top opening to accommodate the chip, the light source, the opaque photo shield, and the lens,
   wherein the top opening is covered by the module printed circuit board, and
   wherein the sensor circuit and the light source device are soldered onto a same side of the module printed circuit board and are inside the space formed by the enclosure.

10. The optical mouse of claim 9, further comprising an engagement mechanism for fixing the COB module to the mouse base.

11. The optical mouse of claim 9, wherein the light source device includes a light emitting diode.

12. The optical mouse of claim 9, wherein the lens engages with the opaque photo shield.

13. The optical mouse of claim 9, wherein the lens engages with the module printed circuit board.

14. The optical mouse of claim 9, wherein the enclosure is formed with a cutout for light to pass therethrough.

15. The optical mouse of claim 9, wherein the module printed circuit board further comprises an output terminal for electrically wired connecting to and outputting a mouse control signal to an external host.

16. The optical mouse of claim 9, wherein the module printed circuit board further comprises an input terminal for receiving a button signal or a wheel signal of the optical mouse.

17. The optical mouse of claim 9, wherein the enclosure further covers and fixes the lens.

18. The optical mouse of claim 9, wherein the opaque photo shield and the enclosure are combined as one.

* * * * *